Inventors
MICHAEL FRANCIS NOLAN
ELMER JOHN STORIE

By Jerome A. Grove
Attorney

March 14, 1972    M. F. NOLAN ET AL    3,649,490
METHOD FOR TIMED ELECTROLYTIC PROCESSING OF MASSES
OF ELECTRICALLY CONDUCTIVE METAL PARTS
Filed Nov. 12, 1968    2 Sheets-Sheet 2

Inventors
MICHAEL FRANCIS NOLAN
ELMER JOHN STORIE
By Jerome A. Gross
Attorney 3,649,490
METHOD FOR TIMED ELECTROLYTIC PROCESSING OF MASSES OF ELECTRICALLY CONDUCTIVE METAL PARTS
Michael Francis Nolan, St. Charles, and Elmer John Storie, Webster Groves, Mo., assignors to Diversified Metals Corporation, Hazelwood, Mo.
Filed Nov. 12, 1968, Ser. No. 774,814
Int. Cl. B63g 49/00; B01r 3/00; C22d 1/02; C23b 5/68
U.S. Cl. 204—146                    2 Claims

ABSTRACT OF THE DISCLOSURE

A conventional spiral vibratory conveyor is immersed into an electrolytic tank, to automatically time an electrolytic operation carried out on moving masses of small metal parts. Typical operations include de-electroplating or stripping tin coatings from bits of copper wire, and the electroplating of nuts. As the mass of metal parts is vibrated upward, conductive contact is made, in the intervals between successive vibratory pulses, with electrode means on the spiral flight.

BACKGROUND OF THE INVENTION

Spiral vibratory conveyors have been used not only for conveying but with some additional function carried on simultaneously, such as spray cleaning; and the lower end of the spiral flight has sometimes been immersed in a liquid. For example, in the U.S. patent to Jones, Re. No. 24,281, the conveyor operates in a solvent vapor, and some liquid solvent is sprayed onto metal parts rising on the spiral flight. However, it has not heretofore been considered feasible to immerse the entire spiral flight in a liquid, because liquids will damp the vibratory characteristics of the conveyor and hence interfere with its function of raising the parts on it.

For electrolytic processing operations, such as electroplating and de-electroplating of small metal parts, vibratory conveyors are believed never to have been used. Conductive contact, directly or through similar parts, to an electrode for a known period of time is requisite to proper control of such operations. Parts being vibrated on such a conveyor do not appear to make such conductive contact.

SUMMARY OF THE INVENTION

In the present invention is has been found that a vibratory conveyor will operate with its spiral flight completely immersed in a liquid, by adjustment of the angular direction and amplitude of vibration. It has further been found that, although the upward vibratory pulses imparted to the metal parts or bits, loosen and separate them from each other, they nevertheless fall back, during the intervals between such upward pulses, to rest or dwell together, and in these intervals they make conductive contact with each other.

Applying these findings, we cause masses of small conductive metal parts or bits to travel up the spiral vibrating flight while completely immersed in electrolyte. The sum of the dwell or rest intervals, during which electrolytic processing is carried on, is a fractional function of the total time required for travel up the flight. Thus in a continuous moving process, as contrasted with batch processing, a controlled amount of time for electrolytic processing is provided, with the compactness of the vertically aligned spiral fitted into a circular processing tank.

In one important application of the present invention, namely the de-electroplating or stripping of plated coatings from bits of conductive wire, the conveyor surface of the spiral flight, on which the metal bits travel upwardly through the electrolytic liquid, may itself serve as the anode. In other utilizations, for example in electroplating small metal parts such as nuts, it is preferable that the spiral flight be coated with insulating material. For such use, cathodes mounted in the conveying surface near its top end and bottom end, make contact with the masses of metal parts as they pass up the flight, while anodes of the metal to be plated are inserted in the tank in the conventional manner.

DESCRIPTION OF THE PREFERRED EMBODIMENTS

Figure 1:
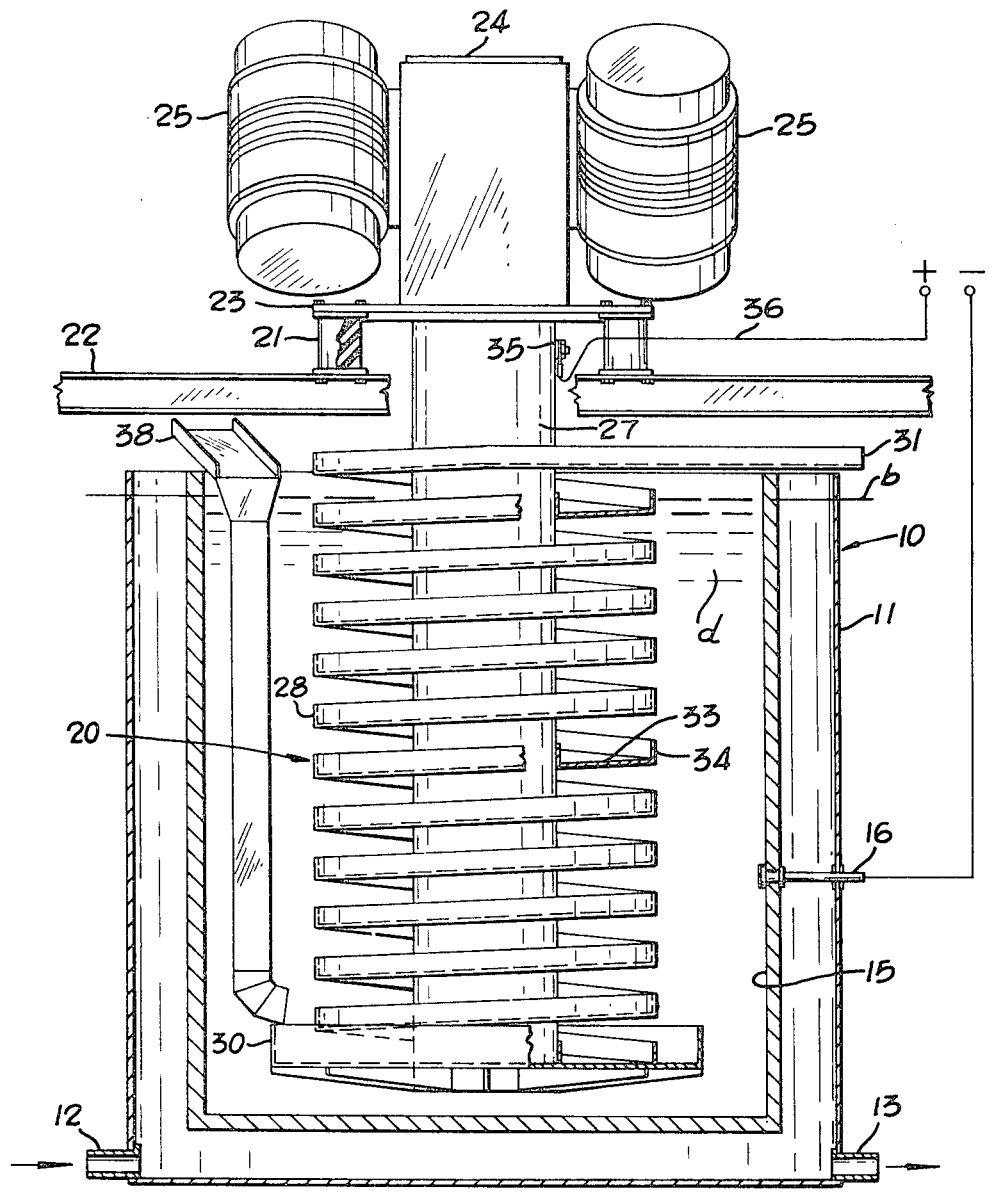
FIG. 1 is a view partly in elevation, partly in section and partly schematic, showing an otherwise conventional spiral vibratory conveyor installed within and above a heated electrolytic tank and so wired as to be adapted for use for de-electroplating.

For purpose of de-electroplating small electrically conductive metal parts, such as stripping the tin coating from chopped bits of salvaged electric wires, the apparatus shown in FIG. 1 is employed. A cylindrical steel tank generally designated 10 has its sides and bottom surrounded by a sealed jacket 11 through which hot water is circulated through an inlet 12 and outlet 13, shown schematically, to maintain electrolyte temperature suitable for de-electroplating. For a de-tinning operation, the inner wall 15 of the tank 10 may be bare, so as to serve itself as the cathode; an insulated electrical connector 16 leads from it to the negative terminal of a source of direct electrical current, as indicated schematically in FIG. 1; thus the inner surface of the tank 10 will itself serve as an electrode means. Alternately, to minimize problems of cleaning the inner wall 15, removable sheets of metal may be suspended inside the tank wall 15 and connected to the connector 16, to serve as cathodes.

The spiral vibratory conveyor generally designated 20 is of the type conventionally used for many industrial operations. Mounted on rubber bushing mounts 21 on beams 22 above the tank 10, it includes a heavy mounting plate 23, an upper central column 24 from which extend a pair of angularly adjustable, oppositely disposed electric motor-powered vibrating heads 25. A depending central vibrating column 27 extends downward from the upper column 24 to a point near the bottom of the tank 10. To its outer periphery is welded a metal spiral conveyor flight 28, extending from the bottom of the depending column 27, where the flight 28 is entered from a feed pan 30, to near the top of the column 27 where it terminates above the top edge of the tank 10 in a substantially horizontal exit chute 31. Between the pan 30 and the exit chute 31, the spiral conveyor flight 28 has a typical cross-section as shown at the right side of FIG. 1. In such cross-section, the spiral flight 28 has a portion 33 extending radially outward, whose upper surface serves as its conveying surface. At the outermost extremity of the portion 33, an upwardly extending outer flange 34 confines the mass of materials or parts vibrated thereon against escape.

In this embodiment shown in FIG. 1, the entire column 27 and conveyor flight 28, and most importantly its conveying surface 33, is exposed, uncoated steel. At the upper end of the vibrating column 27 is a connector post 35, from which an electrical connector 36 leads to the positive terminal of a source of direct current. Thus, the entire conveying surface 33 below the electrolyte level b—b functions as an electrode means.

The feed pan 30 is radially enlarged at one side (the left side as illustrated in FIG. 1) to receive masses of metal bits or parts, not illustrated, introduced to the pan 30 by an inlet chute 38, shown fragmentarily, which extends over the top edge of the tank 10 in angular registration with such enlargement of the pan 30.

For de-tinning a mass of metal parts, such as bits of chopped copper electric wire from which the copper is to be salvaged, the mass is introduced into the pan 30 from the inlet chute 38. By adjustment of the vibratory heads 25, pulses are imposed on the depending column 27 sufficient to overcome the damping effect of the electrolyte $d$ and to impel the mass progressively up the conveying surface 33. These vibratory pulses, as sensed by the bits or parts which make up the mass, are periodic. During 180° of each vibratory cycle, the pulses tend to impel the bits or parts upward, at a greater angle than the slope of the conveyor flight 28 but in its direction; hence during this part of the cycle, the bits or parts are thrown somewhat upward along the conveyor flight 28, and while being so thrown, are so separated from each other as obviously to make no conductive contact with each other or with the conveyor surface 33. However, it is of course impossible for the bits or parts to be impelled in the opposite direction, downward through the conveying surface 33. Hence during some part of the remaining 180° of the cycle, the parts will have fallen together and be briefly at rest on the conveying surface 33. These short intervals of rest or dwell, between the successive upward vibratory pulses, provide time in which the particles are in electrically conductive contact with each other and with the exposed conveying surface 33 which serves as an electrode. During this time the electrolytic processing occurs. The summation of these periods of conductive contact is a material fractional part of the total time required for travel of the bits up the conveyor flight 28, from the pan 30 to the level $b$—$b$ of the electrolyte. Because of the length of the spiral path and the slow rate of travel up it, the flow of the mass of parts to be processed may be continuous, offering substantial manufacturing advantage over batch processes.

For the de-tinning operation described, a caustic electrolyte such as sodium hydroxide is used, heated by flow of hot water through the tank jacket 11. The use as one electrode of the bare metal surfaces of the depending column 27 and conveyor flight 28, is compatible with such a caustic electrolyte, which might damage conventional coatings.

Figure 2:
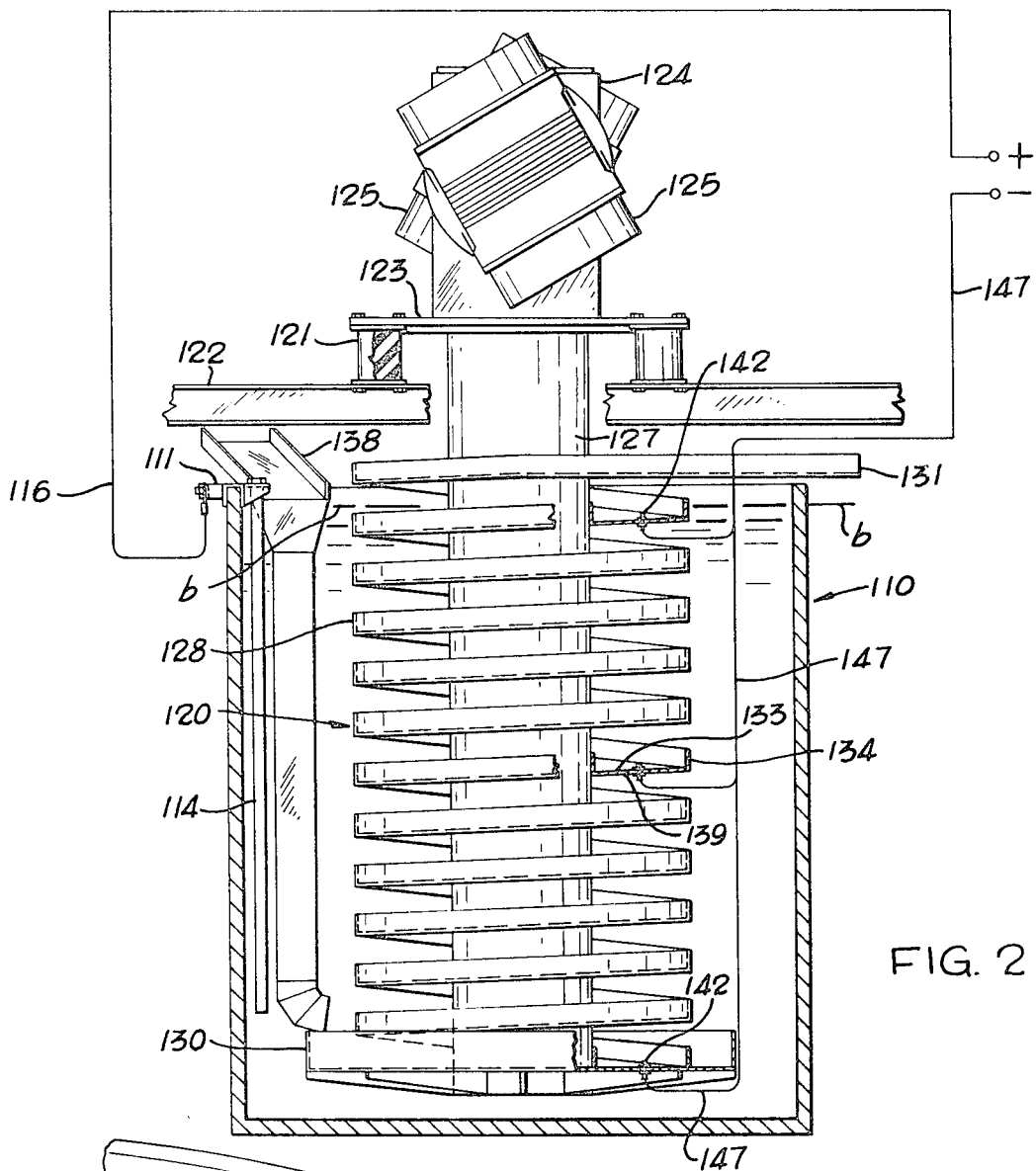
FIG. 2 is a similar view showing such conveyor installed within and above a plating tank and wired in a manner suitable for electroplating.

As a utilization of the invention in which these parts are coated, the embodiment illustrated in FIG. 2 shows a similar spiral vibratory conveyor generally designated 120, installed in a plating tank, and wired suitably for electroplating operations. The circular plating tank there illustrated, generally designated 110, may be conventional in all particulars. Suspended within the tank wall by an insulating anide-holding bracket 111, are one or more plating anode bars 114, connected by an electrical connector 116 to the positive terminal of a source of direct current. On beams 122 above the tank 110, mounted on rubber bushing mounts 121, is the mounting plate 123 of a spiral vibratory conveyor generally designated 120. On its upper central column 124 are mounted a pair of angularly adjustable, oppositely disposed electrical motor-powered vibrating heads 125. Extending downward from the mounting plate 123 is the central vibrating column 127 of the conveyor. To its outer periphery is welded a metal spiral conveyor flight 128, formed similarly to the conveyor flight 28 in the embodiment first described and including a spiral conveying surface 133 and an outer flange 134. The flight 128 is entered at the bottom from a feed pan 130, and terminates near the top of the column 127 in an exit chute 131.

In this illustrated embodiment, FIG. 2, the entire depending column 127, all surfaces of the spiral flight 128, and the feed pan 130 are heavily coated with a rubber-like or plastic protective coating 139.

Figure 3:
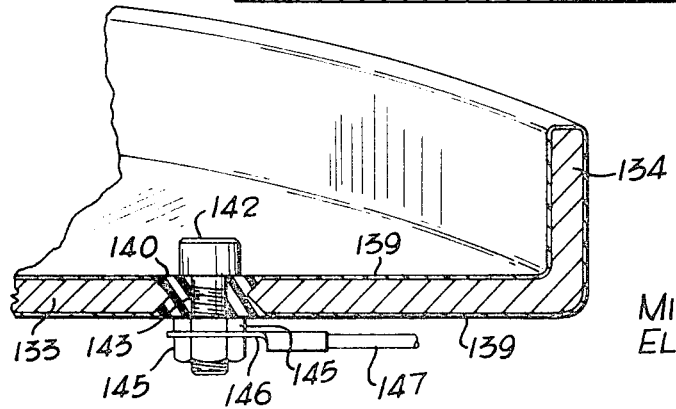
FIG. 3 is an enlarged fragmentary view showing electrode posts installed in the conveyor flight.

Insulator bushings 140, shown in the enlarged fragmentary cross-section FIG. 3, are installed in and through the spiral conveying surface 133 at selected intervals. In the embodiment illustrated only three such bushings are shown, one at the mid-point of the flight, and the other two substantially at the bottom and top thereof, immediately below the level $b$—$b$ of the electrolyte. In each of the insulating bushings 140 and extending somewhat upward above the coating 139 on the conveyor flight surface 133 is mounted an electrode post 142 having a threaded shank portion 143 which extends downward through the bushing 140 and is secured by a pair of clamping nuts 145 which hold between them the connector end 146 of an electrical connector 147, by which the electrode posts 142 are connected to the negative terminal of a direct current source. Use of a predetermined number of electrode posts 22, insulated from the conveyor flight 128, gives control of current density for the plating operation.

For plating with the apparatus described, a conventional plating electrolyte is used, filling the tank 110 to the level $b$—$b$. As in the previously described embodiment, a mass of metal parts to be processed, for example, nuts to be electroplated, is introduced over the top edge of the tank 110 through an inlet chute 138 above and in angular registration with a radially enlarged portion of the pan 130. The feed of such parts from the feed chute 138 continues as earlier portions of the mass climb the flight 128, in a continuous processing operation. When such mass is first introduced into the pan 130, and as soon as a portion of it is vibrated sufficiently to reach the lowermost of the electrode posts 142, the plating operation commences. In the intervals of rest or dwell, when the masses of parts rest together and make conductive contact with the lowermost electrode post 142 and with each other, the plating metal from the anodes 114 is deposited on them. As the mass climbs the conveyor and begins to make conductive contact with the electrode post 142 at the mid height of the flight 128, it will commence functioning as an electrode for the plating operation; as the bits or parts climb further and reach the uppermost electrode post 142 it will likewise commence functioning as an electrode, during the periods of dwell in which the metal parts make conductive contact through each other to it. Hence, the plating operation will continue, during the intervals of dwell, until the mass emerges above the level $b$—$b$ of the electrolyte. If the quantity of parts being fed through the chute 138 is brought to an end, as soon as the last of these parts have passed upward beyond the lowermost electrode post 142 its function will cease. Hence, the lowermost electrode post 142 is required to commence the plating operation as a new mass of material is introduced to the pan 130, for example, at the beginning of a day's operation; while the uppermost electrode post 142 finishes the plating of the final portion of a mass of parts prior to shutting down operations. It is to be understood that additional electrode posts 142 may be used, as desired, for example on each turn of the spiral of the conveyor flight 128.

These specific embodiments described are illustrative of the wide range of electrolytic processing operations for which the present invention is useful, with suitable alterations of equipment which will be obvious to those skilled in the art. Accordingly, the present invention should not be construed narrowly, but rather as co-extensive with the claims.

In the claims which follow, the term "metal parts" includes not merely masses of work pieces, such as nuts, but also masses of metal in bits; and "means within the tank to serve as an electrode element" includes uncoated portions of the inner surface of the tank, if electrically connected to function as an electrode. Likewise, "means at a portion of the conveying surface to serve as an electrode element" includes not only the conveyor surface itself, if exposed and electrically connected as an electrode, but also any electrode means effectively insulated from the conveying surface and spaced sufficiently close to it as to make electrical contact with a mass of metal parts conveyed thereon.

We claim:

1. For purpose of carrying out a timed electrolytic processing operation on masses of electrically conductive metal parts, the new use of that type of vibratory conveyor having a central column, elastic means mounting the column below and adjacent to its upper portion, the upper portion of the column having oppositely disposed vibrating heads, the column having a lower portion depending from the mounting means and supporting on its outer side a generally helical conveyor flight having a vertical axis, a lower feeding inlet end, an upper outlet end, and electrically conductive portions at the conveyor surface of such flight, whereby vibrations of the column on its elastic mounting means alternately dispels such masses of parts upward and away from the conveyor flight and from each other and receives them as they fall back thereon at a generally higher level to form a conductive mass for a brief interval of dwell, which new use comprises positioning such vibratory conveyor by its mounting means with its conveyor flight depending into a stationary electrolytic tank whose width exceeds the diameter of the conveyor flight, and with the flight outlet end projecting above the tank, filling the electrolytic tank with an electrolyte liquid suitable for the processing operation to be carried out, adjusting the angular direction and amplitude of vibration of the vibratory heads to overcome the damping effect of the liquid, connecting such conductive portions of the conveyor flight to one terminal of direct current, whereby to constitute said portions a first electrode contact means, providing within said tank second electrode means spaced from such first electrode means, and connecting said second electrode means to the other terminal of such direct current source, feeding a mass of conductive parts to the feeding inlet at the lower end of the conveyor flight, and operating the vibrating head to vibrate the column on its elastic mounting means within the stationary electrolytic tank, whereby intermittent electrically conductive contact is made, by and through such mass of metal parts, with such conductive portions at the conveyor surface, during the summation of such intervals of dwell between successive vibratory pulses, while such parts travel from the bottom of the conveyor flight upward out of the electrolyte.

2. In salvaging metal from electroplated wire which has preliminarily been reduced to bits, the new use of that type of vibratory conveyor having a central column, elastic means mounting the column below and adjacent to its upper portion, the upper portion of the column having oppositely disposed vibrating heads, the column having a lower portion depending from the mounting means and supporting on its outer side a generally helical conveyor flight formed of electrically conductive metal and having a vertical axis, a lower feeding inlet end, and an upper outlet end, whereby vibrations of the column on its elastic mounting means alternately dispels such masses of parts upward and away from the conveyor flight and from each other and receives them as they fall back thereon at a generally higher level to form a conductive mass for a brief interval of dwell, which new use comprises positioning such vibratory conveyor by its mounting means with its conveyor flight depending into a stationary electrolytic tank whose width exceeds the diameter of the conveyor flight, and with the flight outlet end projecting above the tank, filling the electrolytic tank with an electrolyte liquid suitable for de-electroplating, adjusting the angular direction and amplitude of vibration of the vibratory heads to overcome the damping effect of the liquid, connecting such conveyor flight to a positive terminal of direct current, whereby to constitute an anode, providing within said tank cathode means spaced from the flight, and connecting said cathode means to a negative terminal of such direct current source, feeding a mass of such wire bits to the feeding inlet at the lower end of the conveyor flight, and operating the vibrating heads to vibrate the column on its elastic mounting means within the stationary electrolytic tank, whereby intermittent electrically conductive contact is made, by and through such mass with such conductive portions at the conveyor surface, during the summation of such intervals of dwell between successive vibratory pulses, while such bits travel from the bottom of the conveyor flight upward out of the electrolyte.

References Cited
UNITED STATES PATENTS

| | | | |
|---|---|---|---|
| 2,721,834 | 10/1955 | Koury | 204—287 X |
| 3,420,766 | 1/1969 | Michelson | 204—201 |

JOHN H. MACK, Primary Examiner

R. J. FAY, Assistant Examiner

U.S. Cl. X.R.

204—201, 222, 223